(12) United States Patent
Nikitenko et al.

(10) Patent No.: US 7,567,869 B2
(45) Date of Patent: Jul. 28, 2009

(54) INDUCTION TOOL FOR DETAIL EVALUATION OF NEAR BOREHOLE ZONE

(75) Inventors: Marina N. Nikitenko, Novosibirsk (RU); Leonty A. Tabarovsky, Cypress, TX (US); Mikhail I. Epov, Novosibirsk (RU)

(73) Assignee: Baker Hughes Incorporated, Houston, TX (US)

( * ) Notice: Subject to any disclaimer, the term of this patent is extended or adjusted under 35 U.S.C. 154(b) by 112 days.

(21) Appl. No.: 11/741,575

(22) Filed: Apr. 27, 2007

(65) Prior Publication Data
US 2008/0270032 A1 Oct. 30, 2008

(51) Int. Cl.
*G01V 3/26* (2006.01)
*G01V 3/10* (2006.01)
*G01V 3/36* (2006.01)
*G01V 3/38* (2006.01)
*G01V 3/00* (2006.01)
*G01V 3/08* (2006.01)
*G01V 3/12* (2006.01)
*G01V 3/28* (2006.01)
*G01V 3/30* (2006.01)
*G06F 19/00* (2006.01)

(52) U.S. Cl. .................... 702/7; 73/152.02; 166/248; 166/250.01; 175/40; 175/41; 175/50; 250/253; 250/265; 324/323; 324/333; 324/334; 324/335; 324/336; 324/337; 324/338; 324/339; 324/344; 702/2; 702/6; 702/11; 702/187; 702/189

(58) Field of Classification Search .............. 73/152.01, 73/152.02, 152.05; 166/244.1, 248, 250.01, 166/250.02; 175/40, 41, 50; 250/253, 256, 250/265, 269.1; 324/323, 333, 334, 335, 324/336, 337, 338, 339, 344, 345, 346, 600, 324/691, 693, 702, 707; 367/81, 85, 86; 702/1, 2, 6, 7, 8, 11, 33, 34, 35, 38, 127, 702/187, 189, 190
See application file for complete search history.

(56) References Cited

U.S. PATENT DOCUMENTS 3,259,836 A * 7/1966 Oshry .................. 324/339
3,259,837 A * 7/1966 Oshry .................. 324/339

(Continued)

OTHER PUBLICATIONS

M.A. Frenkel et al.; *Improved Estimation of Hydrocarbon Reserves Using High-Definition Lateral Log Array Data in Vertical and Highly Deviated Wells*, SPE 62912, 2000 SPE Annual Technical Conference and Exhibition, Dallas, Texas Oct. 1-4, 2000, pp. 1-13, 11 Figs.

(Continued)

*Primary Examiner*—Edward R Cosimano
(74) *Attorney, Agent, or Firm*—Madan & Sriram, P.C.

(57) ABSTRACT

Measurements made with an induction logging tool are processed to provide a resistivity model of fluid invasion of the formation. Up to five zones can be determined over a radial distance of about 0.6 m. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

24 Claims, 10 Drawing Sheets

U.S. PATENT DOCUMENTS

| | | | | |
|---|---|---|---|---|
| 3,259,838 | A * | 7/1966 | Thomsen | 324/339 |
| 3,340,464 | A * | 9/1967 | Gouilloud | 324/339 |
| 3,479,581 | A * | 11/1969 | Runge | 324/338 |
| 5,157,605 | A * | 10/1992 | Chandler et al. | 702/7 |
| 5,210,691 | A | 5/1993 | Freedman et al. | |
| 5,278,507 | A * | 1/1994 | Bartel et al. | 324/338 |
| 5,469,062 | A * | 11/1995 | Meyer, Jr. | 324/338 |
| 5,497,321 | A | 3/1996 | Ramakrishnan et al. | 364/422 |
| 5,663,499 | A | 9/1997 | Semmelbeck et al. | 73/152.06 |
| 5,781,436 | A * | 7/1998 | Forgang et al. | 702/7 |
| 5,854,991 | A * | 12/1998 | Gupta et al. | 702/7 |
| 5,883,515 | A | 3/1999 | Strack et al. | 324/339 |
| 5,999,883 | A * | 12/1999 | Gupta et al. | 702/7 |
| 6,211,678 | B1 * | 4/2001 | Hagiwara | 324/338 |
| 6,597,177 | B1 * | 7/2003 | Amini | 324/339 |
| 6,791,330 | B2 * | 9/2004 | McCormick | 324/338 |
| 6,801,039 | B2 | 10/2004 | Fabris et al. | 324/324 |
| 6,950,749 | B2 * | 9/2005 | Frenkel et al. | 702/7 |
| 2001/0038287 | A1 * | 11/2001 | Amini | 324/341 |
| 2004/0012392 | A1 * | 1/2004 | McCormick | 324/338 |
| 2004/0133351 | A1 * | 7/2004 | Frenkel et al. | 702/7 |
| 2007/0024286 | A1 | 2/2007 | Wang | |

OTHER PUBLICATIONS

M.A. Frenkel; *Reducing Uncertainty of Reserves Estimates Using Inversion of Time-Lapse Logging Data*, SPE 100359, SPE Europec/EAGE Annual Conference and Exhibition, Vienna, Austria, Jun. 12-15, 2006, pp. 1-5, 8 Figs.

* cited by examiner

INDUCTION TOOL FOR DETAIL EVALUATION OF NEAR BOREHOLE ZONE

BACKGROUND OF THE INVENTION

1. Field of the Invention

The invention is related generally to the field of acquisition and interpretation of measurements made by well logging instruments for the purpose of determining the properties of earth formations. More specifically, the invention is related to a method for making resistivity measurements to measure the effects of invasion of borehole fluid into the formation.

2. Background of the Art

The estimation of hydrocarbon reserves depends heavily on the accuracy of resistivity data and the reliability of their interpretation. One of the primary difficulties in formation analysis from borehole surveys is the need to determine and compensate for the effects of invasion. Invasion takes place in porous permeable zones where the hydrostatic/dynamic pressure of the drilling mud is greater than the formation pore pressure. The invasion of the mud filtrate will cause a radial variation of the formation resistivity.

One of the objectives of resistivity measurements is to get an estimate of the resistivity of the uninvaded formation. Such a resistivity estimate can be used as a basis for determining hydrocarbon saturation in the formation, and thus serve as a basis for estimating total recoverable hydrocarbons in place. See, for example, U.S. Pat. No. 5,883,515 to Strack et al., having the same assignee as the present invention and the contents of which are incorporated herein by reference. In addition to estimating recoverable hydrocarbons, another parameter of interest is the formation permeability. The formation permeability is related to the rate at which reservoir is capable of producing, a very important factor in determining potential profitability and cash flow from a reservoir.

Reservoir permeability can be estimated using different techniques, such as core analysis, well-log correlation, and well testing. These different techniques result in the values of permeability representative of different sample volumes of the reservoir. Core analysis is expensive and time-consuming and the sample size is too small to characterize a reservoir. Well testing is also a time consuming procedure. Another method that may be used is to make time-lapse measurements of resistivity. The rate at which the borehole fluid invades the formation depends on the permeability; consequently, the radial variation of resistivity at different times will depend on the permeability. Simulated resistivity logs based on petrophysical models may be compared to actual resistivity profiles, and model parameters such as permeability may be adjusted to provide a good match between the simulated and actual measurements. See, for example, U.S. Pat. No. 5,497, 321 to Ramakrishnan et al. and Frenkel (SPE 100359).

Having discussed some examples on the utility of making resistivity measurements, we briefly discuss some prior art methods of determining formation resistivity. Frenkel et al. (SPE 62912) discusses the use of galvanic measurements (specifically, High-Definition Lateral Log measurements) for determining a resistivity model. FIG. 3 illustrates resistivity model used in Frenkel. The model includes formation layers surrounding a borehole having a diameter $D_{bh}$ filled with mud having resistivity $R_m$. This model is typical of those that have been used in the past, and basically approximates each layer by an invaded zone having a length $L_{x0}$ and resistivity $R_{x0}$ and an uninvaded zone having a resistivity $R_t$. A possible refinement that has been used is to add a flushed zone, defining a three radial-layer model. A review of Frenkel shows that a typical depth of the invaded zone is about 2 ft. (0.6 m). Similar models have been used for inverting resistivity measurements made with an induction logging tool. See, for example, Semmelbeck et al. (U.S. Pat. No. 5,663,499).

The accuracy of saturation estimates and permeability estimates depends on the accuracy and reliability of methods of obtaining and analyzing formation resistivity measurements to provide an accurate radial resistivity model. In this regard, it is desirable to be able to define multiple zones with high resolution in the first 2 ft. (0.6 m) or so. The present invention satisfies this need.

SUMMARY OF THE INVENTION

One embodiment is a method of evaluating invasion of a borehole fluid into an earth formation. The method includes conveying into a borehole a resistivity measuring instrument having at least one transmitter and a plurality of pairs of receivers spaced apart from the at least one transmitter. The transmitter is activated and at least one frequency and signals are induced in the plurality of pairs of receivers that are indicative of the resistivity of at least three subzones inside an invaded zone. The induced signals are filtered to provide an estimate of the resistivity of the at least three subzones. The estimate of the resistivity may be recorded on a suitable medium. One of each of the pairs of receivers may be used as a main coil and the other of each of the pairs of receivers may be used as a bucking coil. The at least one frequency may be less than 25 kHz. The method may further include activating the at least one transmitter at a plurality of frequencies greater than about 0.5 MHz and inducing additional signals in the receivers, and using the estimate of the resistivity and the additional signals for providing an updated estimate of the resistivity of the at least three zones. The borehole fluid may have a resistivity greater than about 0.10 Ω-m. The at least three zones may include at least five zones. A distance from the transmitter to at least one of the receivers may be greater than 1 m. A distance from a transmitter to at least one of the receivers may be less than 0.3 m. Providing the updated estimate of resistivity may be done using an iterative gradient method. The measurements may be repeated after an elapsed time interval, and the resistivities before and after the elapsed time interval may be used for estimating a permeability of the formation.

Another embodiment of the invention is an apparatus for evaluating invasion of a borehole fluid into an earth formation. The apparatus includes a resistivity measuring instrument configured to be conveyed into the borehole. The instrument includes at least one transmitter configured to be activated at least one frequency, and a plurality of pairs of receivers spaced apart from the at least one transmitter. The receivers are configured to receive signals resulting from activation of the at least one transmitter. The signals are indicative of a resistivity of at least three subzones inside an invaded zone. The apparatus further includes a processor configured to filter the signals from the plurality of pairs of receivers and provide an estimate of the resistivity of the at least three zones. The processor may be further configured to record the estimate of the resistivity on a suitable medium. Each of the pairs of receivers may include a main receiver and a bucking receiver. The at least one frequency may be less than 25 kHz. The at least one transmitter may be further configured to be activated at a plurality of frequencies greater than about 0.5 MHz, and the processor may be further configured to use the estimate of the resistivity and additional signals from the plurality of receivers resulting from the further activation of the at least one transmitter to provide an updated estimate of the resistivity of the at least three zones.

The borehole may contain a fluid having a resistivity greater than about 0.1 Ω-m. The at least three zones may include five zones. A distance from the transmitter to at least one of the pairs of receivers may be greater than 1 m. A distance from the transmitter to at least one of the pairs of receivers may be less than 0.3 m. The processor may be configured to provide the updated estimate of the resistivity using an iterative gradient method. The apparatus may include a conveyance device a configured to convey resistivity measuring instrument into the borehole; the conveyance device may be a wireline or a drilling tubular.

Another embodiment of the invention is a computer-readable medium for use with an apparatus for evaluating invasion of a borehole fluid into an earth formation. The apparatus includes a resistivity measuring instrument configured to be conveyed into the borehole. The instrument includes at least one transmitter configured to be activated at least one frequency and a plurality of receivers spaced apart from the at least one transmitter configured to receive signals resulting from the activation of the at least one transmitter. The signals are indicative of a resistivity of at least three subzones inside an invaded zone. The medium includes instructions which enable a processor to filter the signals from the plurality of receivers and provide an estimate of the resistivity of the at least three subzones. The medium may include a read-only memory, a programmable read-only memory, an electrically programmable read-only memory, an electrically alterable read-only memory, an electrically erasable and programmable read-only memory, a flash memory, an optical disk, a hard drive, an iPod®, and/or a non-volatile read-write memory.

BRIEF DESCRIPTION OF THE FIGURES

The present invention is best understood with reference to the accompanying figures in which like numerals referred to like elements and in which:

FIG. 4a: invasion zone is represented by 3 radial zones, FIG. 4B: invasion zone is represented by 5 radial zones;

In FIG. 5A, the invasion zone is represented by 3 radial zones and in FIG. 5B, the invasion zone is represented by 5 radial zones;

In FIG. 6A, the invasion zone is represented by 3 radial zones and in FIG. 6B, the invasion zone is represented by 5 radial zones;

DETAILED DESCRIPTION OF THE INVENTION

Figure 1:
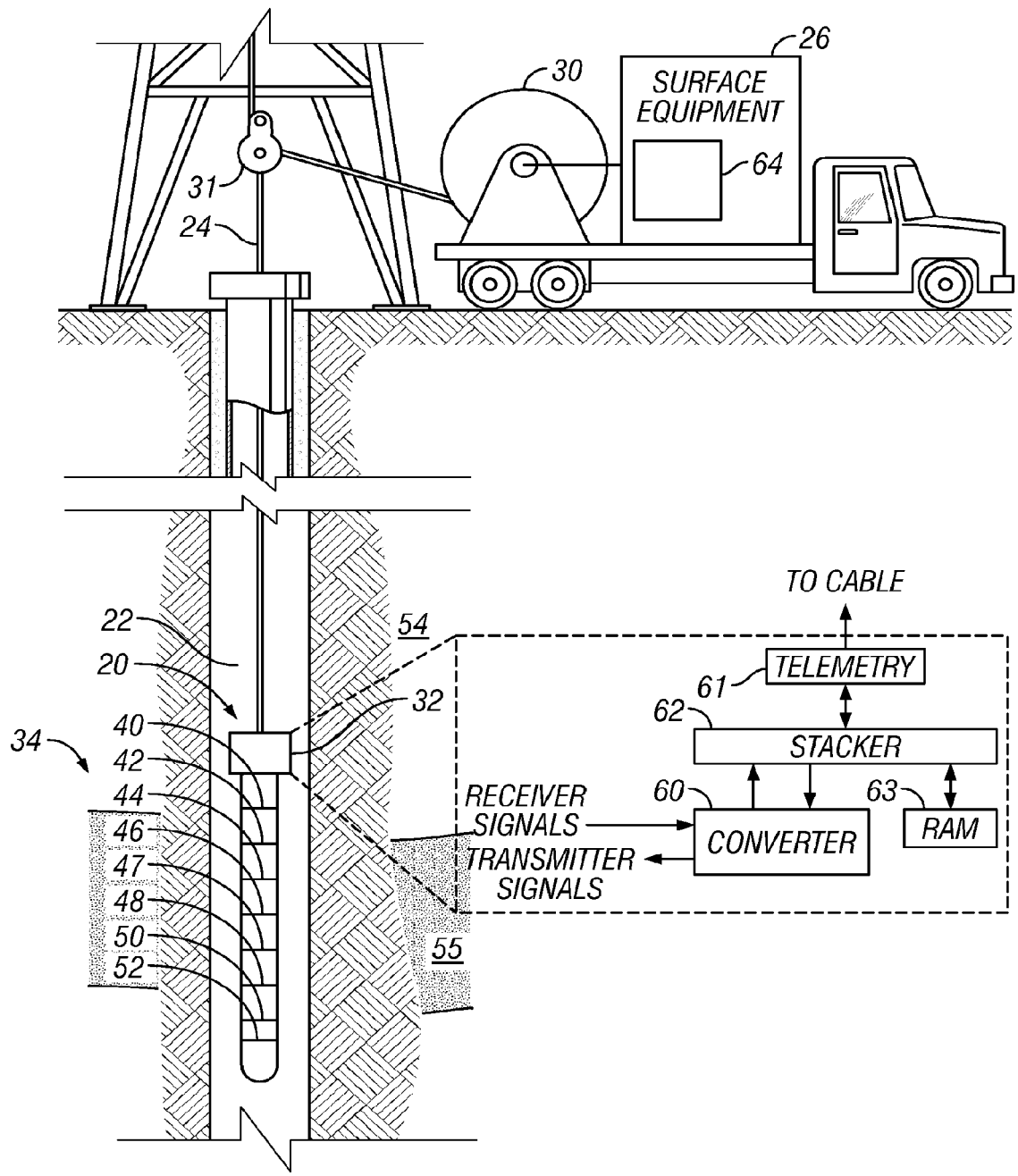
FIG. 1 shows an induction instrument disposed in a wellbore penetrating an earth formation.

Referring now to FIG. 1, an induction logging tool 20 suitable for use with the present invention is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which passes over a sheave 31 located at the surface of the borehole 22. The cable 24 is typically spooled onto a drum 30. The cable 24 includes insulated electric conductors for transmitting electrical signals. The electronic circuitry section 32 of the tool 20 receives signals from the sonde 34 to perform various analog and digital functions, as will be described later.

The sonde 34 may include a plurality of coils 40-52. Coil 46 is a transmitter coil for transmitting an oscillating signal into the adjacent surrounding geological formation 54. It is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46 which in turn generates an electromagnetic field in the surrounding formation 54. The electromagnetic field, in turn, induces eddy currents, which flow coaxially with respect to the borehole 22. The magnitudes of the eddy currents are related to the conductivity of the surrounding formation 54. The remaining coils 40, 42, 44, 47, 48, 50 and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity that is indicative of the possibility of containing hydrocarbons may be located. The number of receiver coils shown is for illustrative purposes only; more or fewer coils may be used.

The electronic circuitry section 32 may include a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40-52 and transforming them into digitized signals for further processing by the stacker circuit 62. The analog voltage signals provided by the receiver coils 40-52 are digitally sampled according to a predetermined sampling rate in the period defined by the fundamental frequency of the transmitter signal, which in a typical embodiment is approximately 10 kHz.

The sampling may be repeated over a large number of transmitter voltage signal cycles, preferably at least 1,024 cycles to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are stored in the RAM 63. The stacked signals corresponding to the plurality of receiver coils 40-52 can then be retrieved from the RAM 63 and can be transmitted by the telemetry circuit 61 through the cable 24 to a processor 64 which forms part of the surface equipment 26, where analyses of the stacked signals can be performed. Alternatively, processing of at least part of the data could be performed downhole using a processor at a suitable location (not shown) and results of the processing telemetered uphole.

In an alternative embodiment, a processor having sufficient digital signal processing capabilities could form part of the electronic circuitry section 32. Thus, it is contemplated that the required discrete Fourier transform could be performed downhole, which would further reduce the amount of data to be transmitted to the surface.

Figure 2:
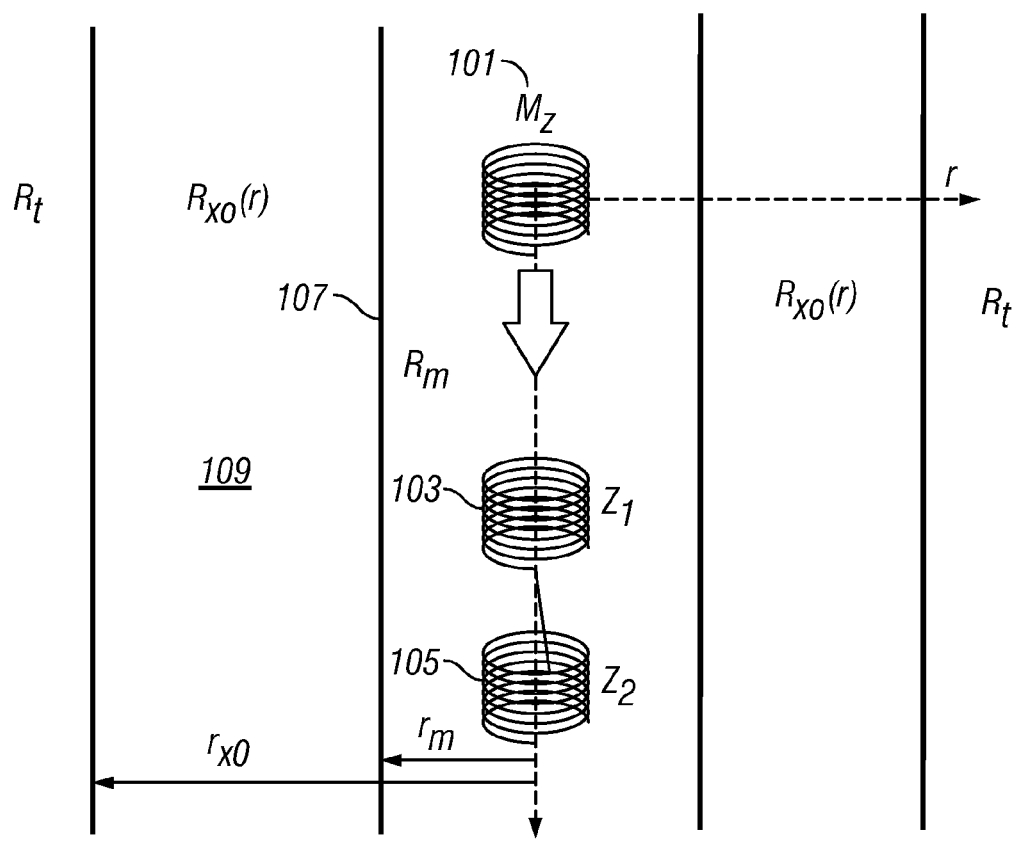
FIG. 2 shows the arrangement of transmitter and receiver coils in an embodiment of the present disclosure.
Figure 3:
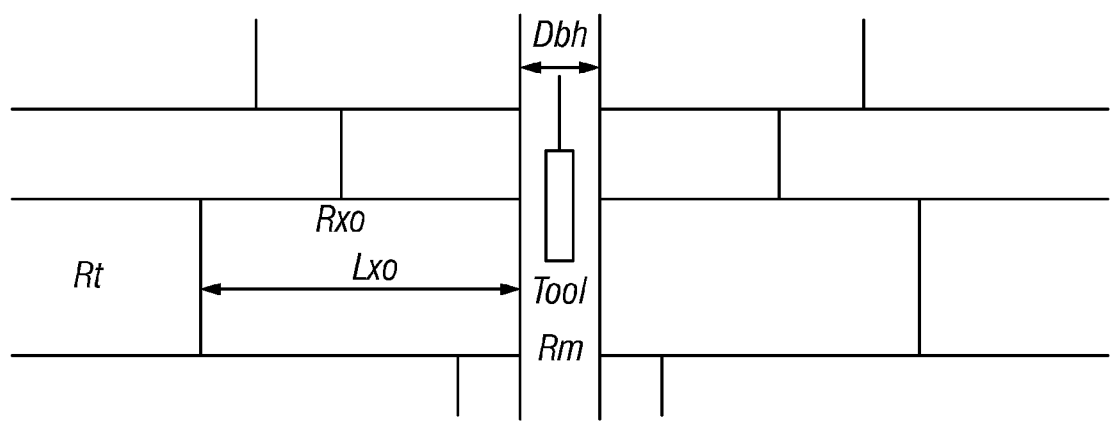
FIG. 3 shows an exemplary model with an invaded zone.

Turning now to FIG. 2, a suitable configuration of transmitter and receiver coils is illustrated. Three-coil induction tool configuration is considered. Its elements are: transmitter 101 of moment $M_z$, main receiver 103 ($Z_1$) and bucking coil 105 ($Z_2$). Thus, each of the receiver coils of FIG. 1 consists of the main receiver and a bucking coil. The tool is positioned on the axis of the borehole 107 of resistivity $R_m$ and radius $r_m$. Resistivity of the formation is $R_t$. Radial resistivity profile in the invasion zone 109 of radius $r_{xo}$ is described by a stepwise function $R_{xo}(r)$.

Figure 4A:
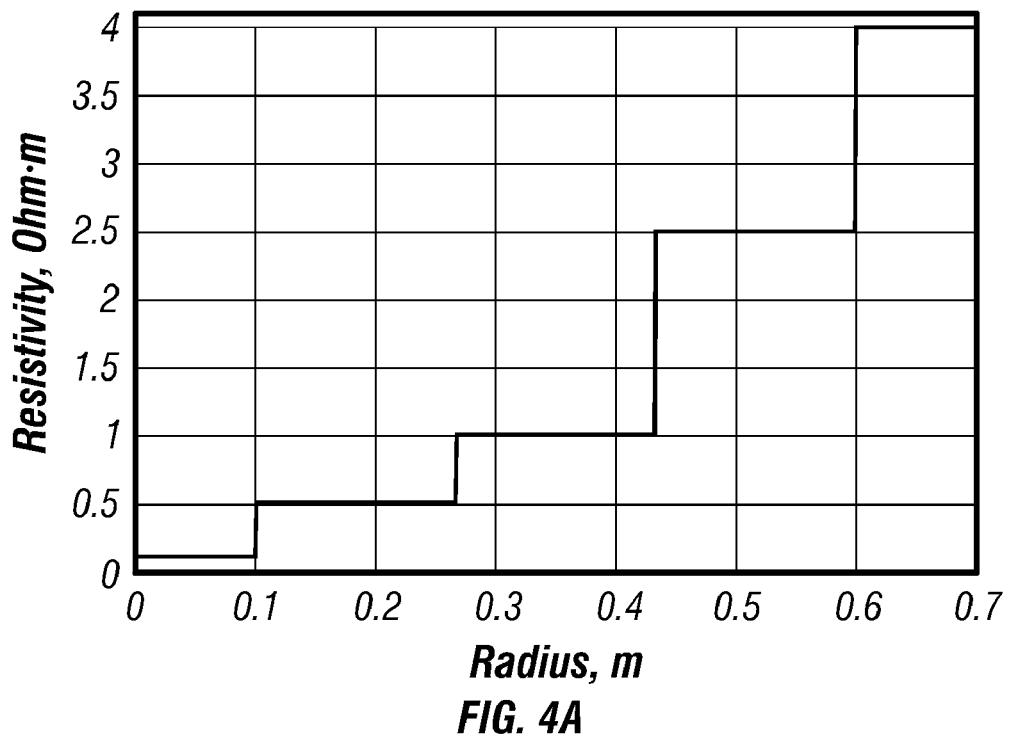
FIGS. 4A, 4B show an exemplary model with biopolymer drilling mud, water-bearing formation. $R_m$=0.1 Ω-m; $R_t$=4 Ω-m.
Figure 4B:
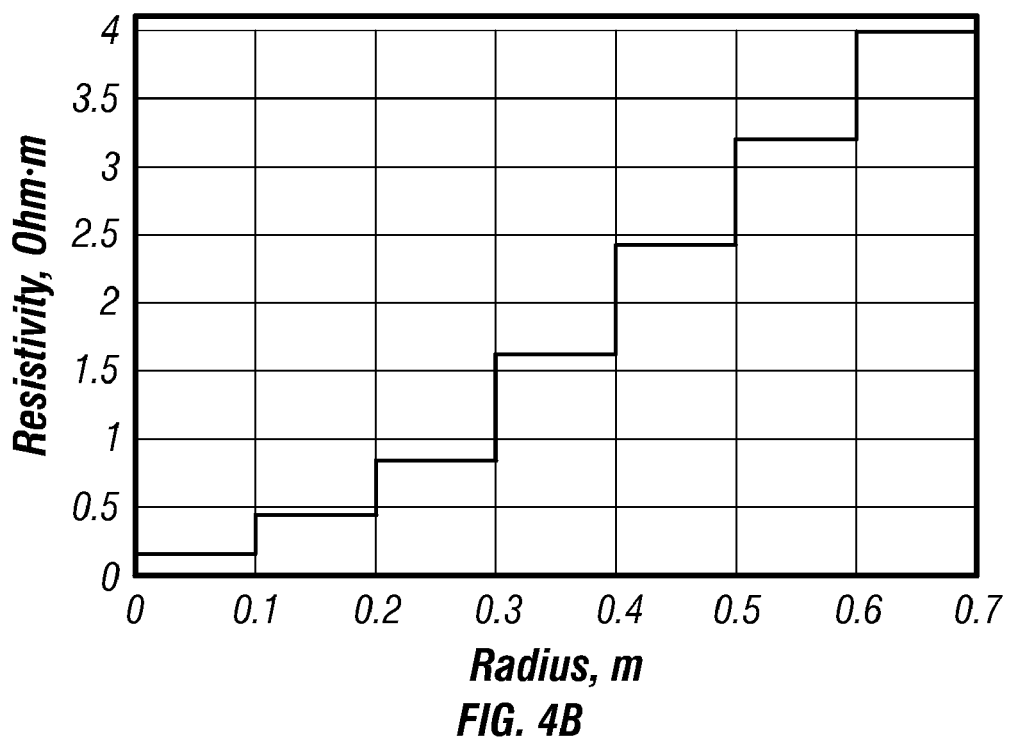
Figure 5A:
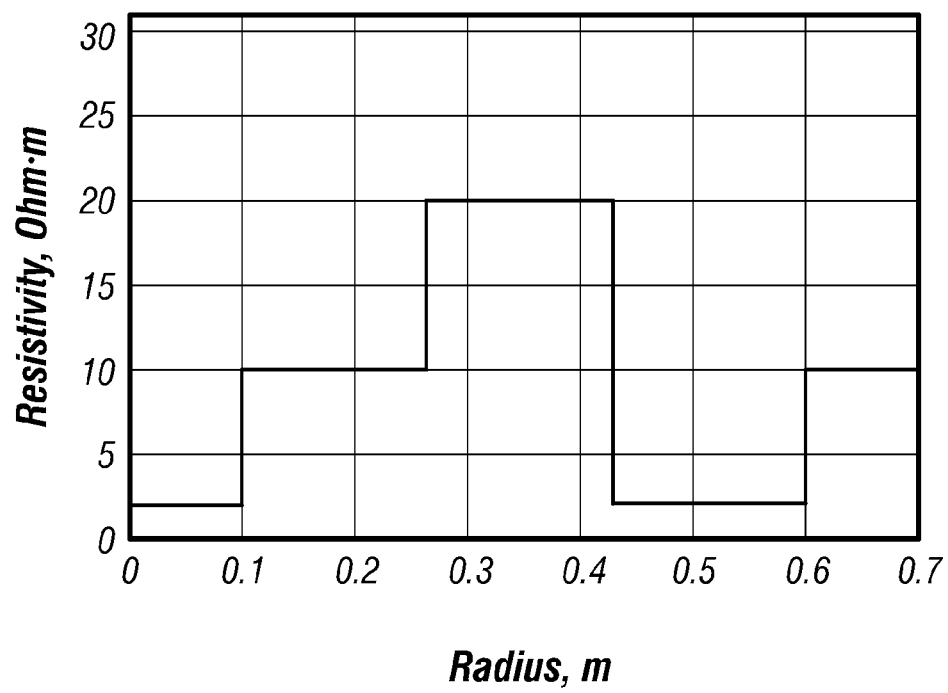
FIGS. 5A, 5B show an exemplary model with water based mud, water-oil-bearing formation. $R_m$=2 Ω-m; $R_t$=10 Ω-m.
Figure 5B:
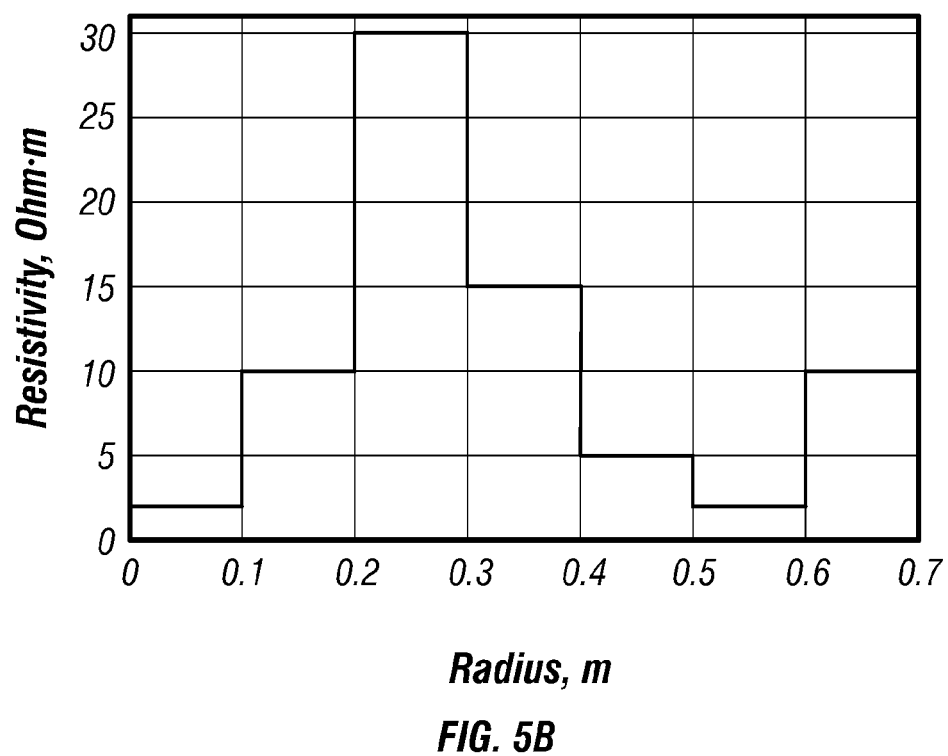
Figure 6A:
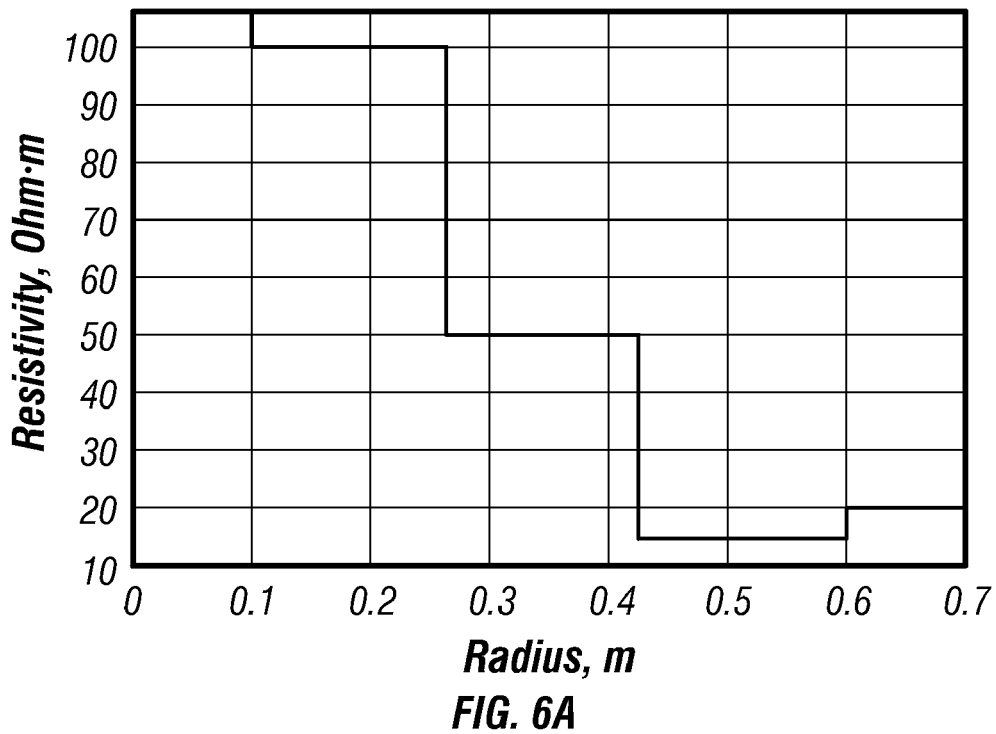
FIGS. 6A, 6B show an exemplary model with Oil-based mud, oil-bearing formation. $R_m$=1000 Ω-m; $R_t$=20 Ω-m.
Figure 6B:
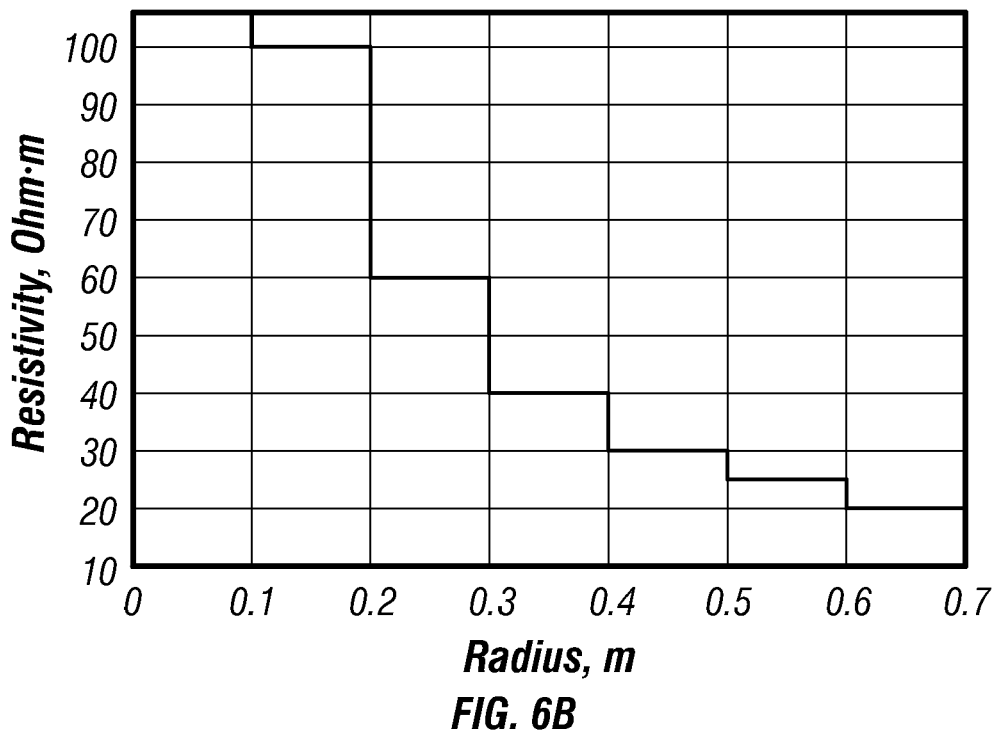

The ability of the methods of the present invention to respond to a variety of different models was evaluated. These were intended to cover a variety of drilling muds and formation resistivities. An exemplary model, shown in FIGS. 4a, 4b simulated a biopolymer drilling mud, water-bearing formation. $R_m$=0.1 Ω-m; $R_t$=4 Ω-m. In FIG. 4a, the invasion zone is represented by 3 radial zones while in FIG. 4b, the invasion zone is represented by 5 radial zones. The model of FIGS. 5a, 5b are for water based mud, water-oil-bearing formation. $R_m$=2 Ω-m; $R_t$=10 Ω-m. In FIG. 5a, the invasion zone is represented by 3 radial zones while in FIG. 5b, the invasion zone is represented by 5 radial zones. FIGS. 6a, 6b show an exemplary model with Oil-based mud, oil-bearing formation. $R_m$=1000 Ω-m; $R_t$=20 Ω-m. In FIG. 6a, the invasion zone is represented by 3 radial zones and in FIG. 6b the invasion zone is represented by 5 radial zones.

Results from three types of data acquisition and inversion are discussed. The first, referred to as the Low Frequency Method, used a dense set of arrays spacings and a single frequency. The arrays were chosen with $z_2$=0.25, 0.562, 0.875, 1.188, 1.50, 1.812, 2.125 (m), $z_1$=0.8$z_2$; f=10 kHz; M=7–the number of measurements. The measured signal is the difference of the emf real parts in the three-coil array.

The second method discussed, referred to as the High Frequency Method, used frequencies up to 10 MHz. This is an attempt to avoid the dielectric effect and technological complications of constructing coils at very high frequencies. The same array spacings as in the Low Frequency method were used, and the following set of frequencies were selected:
f=2.128, 3.275, 4.308, 5.237, 6.073, 6.826, 7.503, 8.113, 8.662, 9.156, 9.6, 10 (MHz).

This gives a total of 84 measurements.

The third method discussed is the Very High Frequency Method. The following system of lengths and frequencies was chosen:
$z_2$=0.25, 0.494, 0.732, 0.964, 1.19, 1.41, 1.624, 1.832 (m);
$z_1$=0.2, 0.4, 0.6, 0.8, 1.0, 1.2, 1.4, 1.6 (m);
f=20.988, 50.791, 74.633, 93.706, 108.96, 121.17, 130.94, 138.75, 145, 150 (MHz);
M=80.

The measured signal is the phase difference in the three-coil array. An assumption was made that the dielectric constant does not have a significant influence on the resolution, and it has been assumed that it is equal to zero.

For each of the methods, the results of inversion are shown. Simulated data $\vec{F}^E$ are modeled based on the true model, with an additive random error (less than or equal to 1% at each measurement). The pattern of error distribution is unknown. We also assume that the resistivities of the mud and formation are known. The mud resistivity may be estimated, for example, using the apparatus described in U.S. Pat. No. 6,801,039 to Fabris et al. the contents of which are incorporated herein by reference. The formation resistivity may be obtained using low frequency measurements made with an induction tool having a large transmitter-receiver distance. To estimate the quality of the solution we will use mean square deviation of model data $\vec{F}$ (based on the resulting model) from synthetic data:

$$\Delta = \sqrt{\frac{1}{M}\left(\frac{F_j^E - F_j}{F_j^E}\right)^2} \cdot 100\%,$$

and also we will calculate the integral conductivity of invaded zone.

Figure 7A:
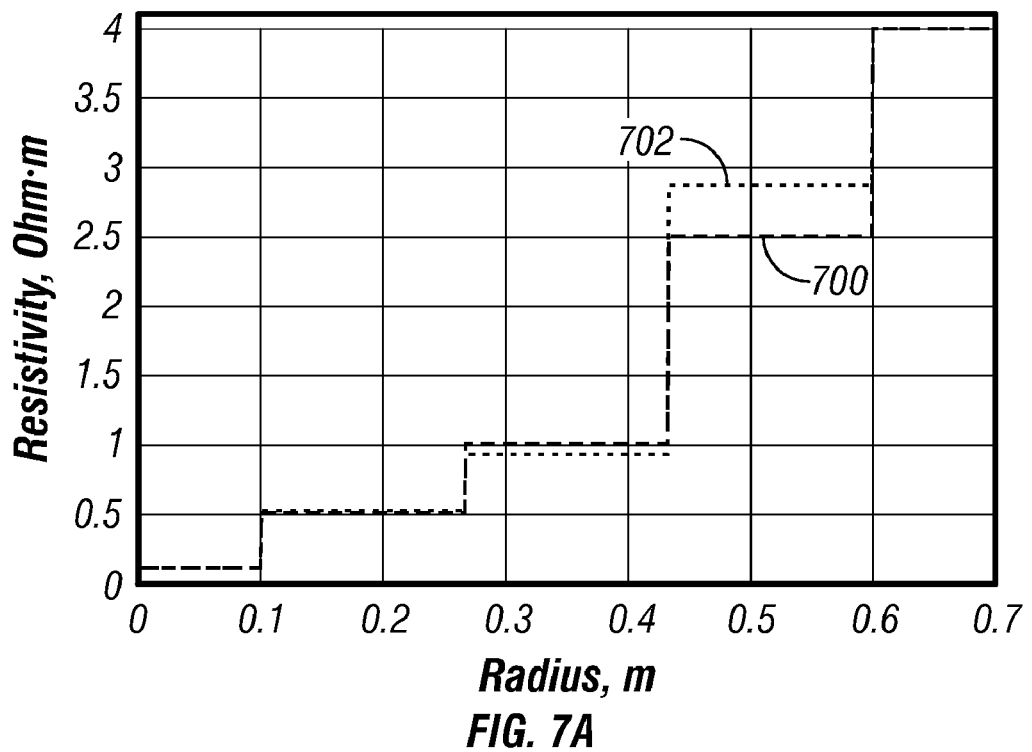
FIGS. 7A, 7B show inversion results for the model of FIG. 4B using low frequencies (FIG. 7A) and high frequencies (FIG. 7B)
Figure 7B:
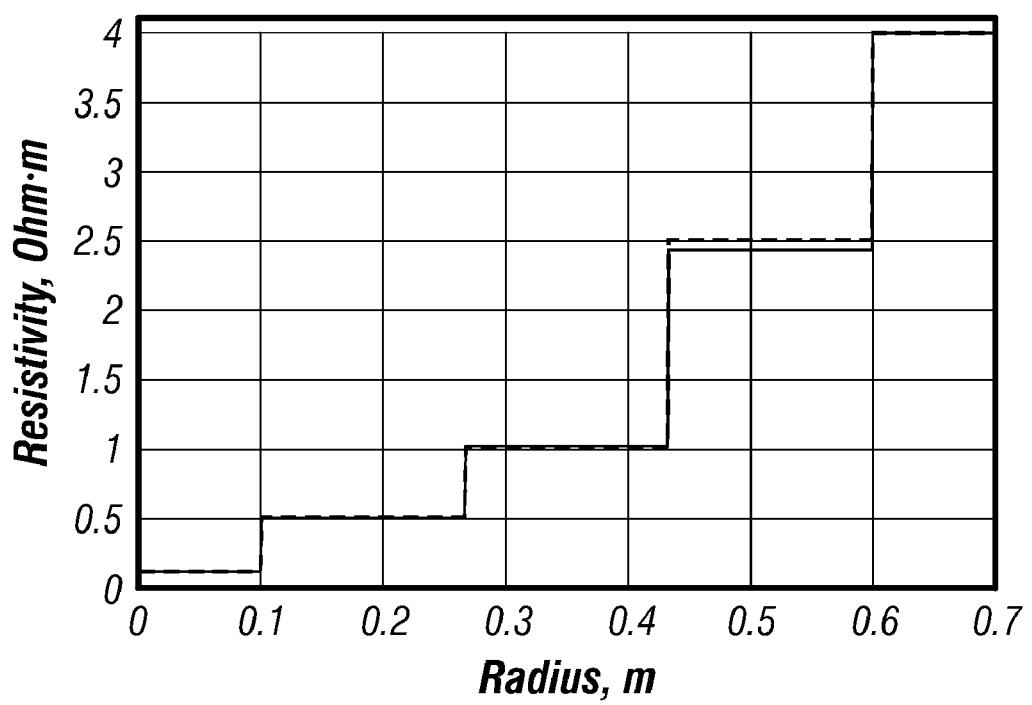

Turning now to FIG. 7a, results for the model of FIG. 4a are shown, Shown is the actual model 700 along with an inverted model 702 derived using the Low Frequency Method. For this example, the value of Δ=0.5%. The relative error of defining the first subzone resistivity is 3.2%, of the second zone—7.6%, of the third zone—15%. The true integral conductivity is 0.567 S/m, while the recovered conductivity is 0.561 S/m, giving a relative error of 1%. The results of the low frequency method were used as an initial estimate in the high frequency method. FIG. 7b shows the result of using the High Frequency Method. This has a value of Δ=1%. The relative error of defining the first and the second subzones resistivity is less than 1%, of the third—2.8%. The true integral conductivity is 0.567 S/m, recovered conductivity is 0.570 S/m, with a relative error is 0.5%.

Figure 8A:
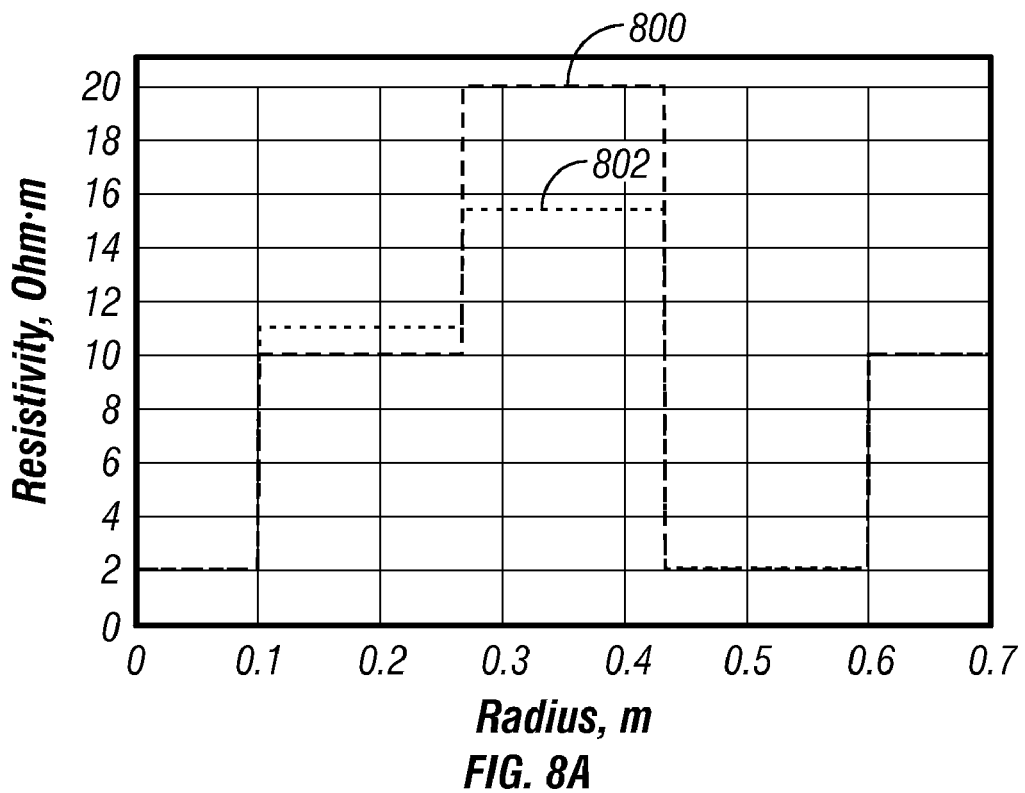
FIGS. 8A, 8B show inversion results for the model of FIG. 5A using low frequencies (FIG. 8A) and high frequencies (FIG. 8B)
Figure 8B:
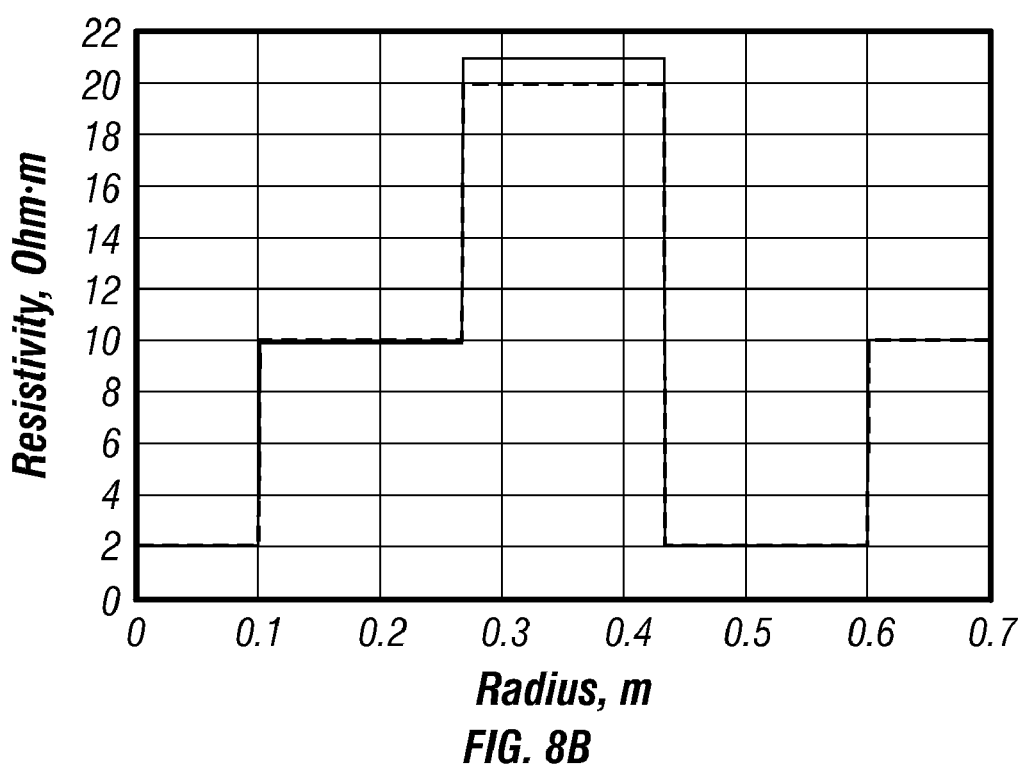

Turning now to FIG. 8A, results for the model of FIG. 5A are shown, Shown is the actual model 800 along with an inverted model 802 derived using the Low Frequency Method. For this example, the value of Δ=0.4%. Relative error of defining the first subzone resistivity is 10%, of the second—23%, of the third—2%. The true integral conductivity is 0.108 S/m, recovered conductivity is the same. The results of the low frequency method were used as an initial estimate in the high frequency method. FIG. 8B shows the result of using the High Frequency Method. This has a value of Δ=0.9%. Relative error of defining the first subzone resistivity is 1%, of the second zone —5%, and of the third zone—0.5%. The true integral conductivity is 0.108 S/m, recovered conductivity is the same.

Figure 9A:
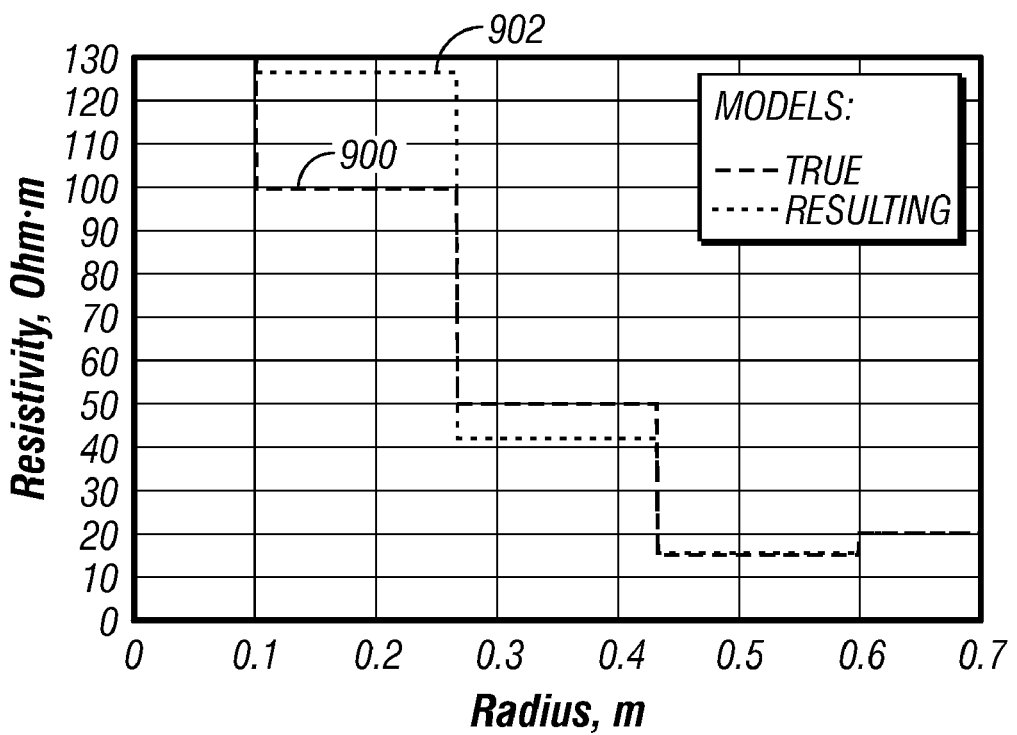
FIGS. 9A, 9B show inversion results for the model of FIG. 5A using low frequencies (FIG. 9A) and high frequencies (FIG. 9B)
Figure 9B:
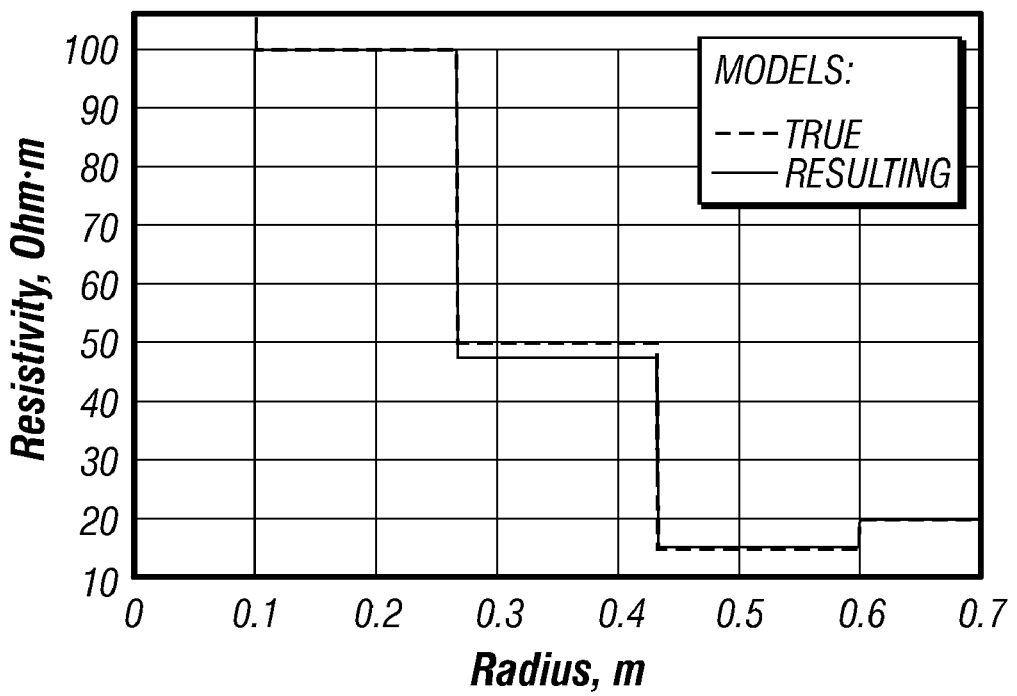

Turning now to FIG. 9a, results for the model of FIG. 6a are shown, Shown is the actual model 900 along with an inverted model 902 derived using the Low Frequency Method. For this example, the value of Δ=0.4%. Relative error of defining the first subzone resistivity is 27%, of the second zone—16%, and of the third zone—3.3%. The true integral conductivity is 0.016 S/m, and the recovered conductivity is the same. The results of the low frequency method were used as an initial estimate in the high frequency method. FIG. 9b shows the result of using the High Frequency Method. This has a value of Δ=1%. Relative error of defining the first subzone resistivity is 0.1%, of the second—5%, of the third—2%. The true integral conductivity is 0.016 S/m, recovered conductivity is the same.

The following points may be noted with respect to FIGS. 7a, 7b, 8a, 8b, 9a and 9b. The low frequency method gives a higher error with resistive formations and/or resistive mud, while the high frequency method does not appear to have this problem. Compare FIG. 8a to 8b, and FIG. 9a to 9b. Both methods give an integral conductivity that is close to the true value. The results also show that using the high frequency method, it is possible to resolve three invaded zones within a distance of 0.6 m from the borehole for a wide range of mud, formation and invaded zone properties.

Figure 10:
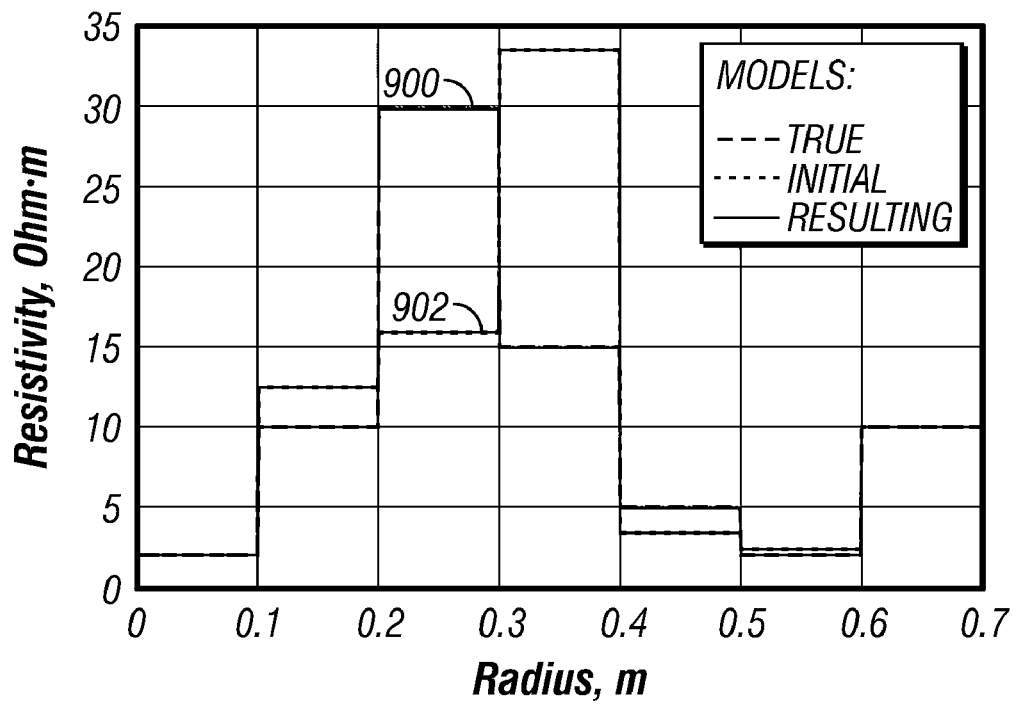
FIG. 10 shows an inversion result for the model of FIG. 5B.

Turning next to FIG. 10, results of using the very high frequency method for the model of FIG. 5b are shown. The curve 902 is the initial model and 900 is the actual model that is indistinguishable from the final result. $\Delta=0.5\%$. The relative error of defining all the subzones resistivity is less than 1%. The true integral conductivity is 0.09 S/m, and the recovered conductivity is the same.

Next, we explain in some detail the method of analysis and inversion of the measurements. We consider different linear representations of the forward problem and filters as the mean of solving the inverse problem. Then we use two approaches to determine the resistivities of the invaded zone. The first approach is based on Doll approximation and the second is based on the Jacobian. The first approach allows us to build an initial guess. It is a rigorous solution of the linear system and using it we can distinguish no more than 3 subzones when the resistivities of the borehole and formation are known. The second approach enables to improve the initial guess at high frequencies (less than 10 MHz) and distinguish up to 5 subzones at very high frequencies (less than 150 MHz). It is an iterative procedure which requires a good initial guess.

The forward problem of electromagnetic logging can be expressed as:

$$\vec{F} \approx \vec{F}_0 + \hat{G}(\vec{p} - \vec{p}_0) \quad (1)$$

or $$\vec{F} \approx \hat{G}\vec{p} \quad (2)$$

where $G_{ji}$ is the contribution of parameter $p_i$ into the signal $F_j$, $i=1, \ldots, N$, $j=1, \ldots, M$; N is the number of parameters, M is the number of measurements. In this document we use the following linear representations of the forward problem:

(a) Doll approximation: $G_{ji}$ is a geometric factor (a value that does not depend on medium conductivity), that is, a contribution into the signal $F_j$ from the area corresponding to conductivity $\sigma_i$ when the rest of the medium has zero conductivity, and the area's conductivity is equal to $\sigma_{0i}$, $p_i = \sigma_i/\sigma_{0i}$;

(b) the first term in Taylor series: $G_{ji}$ is a derivative of the signal $F_j$ with respect to the parameter of the model $p_i$ at $\vec{p}_0$.

To solve the inverse problem, filters may be used to minimize background parameters effect and to maximize the influence of parameters to be determined. We partition the unknown parameters into N1 background parameters and N2 parameters to be determined. Thus, $p_i$, $i=1, \ldots, N1$ be background parameters; $p_i$, $i=N1+1, \ldots, N$ being parameters to be determined, $N2=N-N1$.

We should find the vector $\vec{c}$ (filter) which satisfies the equation:

$$\begin{cases} \vec{g}_l^T \cdot \vec{c} = 0, & l = 1, N1 \\ \vec{g}_k^T \cdot \vec{c} = \alpha_k, & k = 1, N2 \end{cases} \quad (3)$$

Here $\vec{g}_l$—columns of matrix $\hat{G}$ corresponding to background parameters, $\vec{g}_k$—columns corresponding to parameters we intend to determine.

We can express the same in a matrix form:

$$\hat{G}^T \vec{c} = \vec{A} \quad (4)$$

The first N1 elements of the vector $\vec{A}$ are zeros, the next N2 elements are coefficients $\alpha_k$. In this case signal transformation $\vec{c}^T \vec{F}$ will have reduced sensitivity to parameters $p_l$, $l=1, \ldots, N1$ and increased sensitivity to parameters $p_k$, $k=1, \ldots, N2$ depending on the ratio of $\alpha_k$ values. We solve the inverse problem using this transformation.

We assume that $M \geq N$ and solve the set of equations (4) by means of singular value decomposition (SVD) method. In the case of no singularity at $R=N$ (where R is the rank of the $\hat{G}$ matrix) the solution $\vec{c}$ has the minimal norm and belongs to the subspace $\vec{g}_k$, $k=1, \ldots, N2$. In the case of an incompatible set, we arrive at an approximate solution at $R<N$, and this solution corresponds to both the norm minimum and the minimum of quadratic residual.

In an alternate approach we solve the inverse problem with $\hat{G}$ being the matrix of geometric factors We write equation (2) in normalized form:

$$\vec{F}_N \approx \hat{G}\vec{p} \quad (2a)$$

where $$F_{Nj} = \frac{F_j(\vec{\sigma})}{F_j(\vec{\sigma}_0)}, \quad G_{ji} = \frac{F_j(0, \ldots, 0, \sigma_{0i}, 0, \ldots, 0)}{F_j(\vec{\sigma}_0)}, \quad p_i = \frac{\sigma_i}{\sigma_{0i}}.$$

Let the system of measurement consist of three-coil arrays lined up along the borehole axis. The source is a vertical magnetic dipole $M_z$, current's density in which follows the law of $e^{-i\omega t}$ ($f=\omega/(2\pi)$ is the frequency); the measured signal is the difference of imaginary components of the magnetic field $H_z$ in two-coil arrays. Mf of frequencies and Ml of array lengths are used in such a way that Mf·Ml=M.

The model of the medium is cylindrically layered. The first layer is the borehole itself with its conductivity $\sigma_1$ and radius $r_1$, the last layer is the formation of conductivity $\sigma_N$. Layers numbered from 2 to N-1 constitute invaded zone. Conductivities of layers are $\sigma_i$, their radii are $r_i$, $i=2, N-1$; $r_1=0.1$ m is the borehole radius; $r_{N-1}=0.6$ m is the radius of invaded zone.

To analyze how much layers (subzones) the invaded zone can be subdivided into, we assume that resistivities of the borehole and of the formation are known. If this is not so, we should first determine their values. From now on, when we talk about the matrix $\hat{G}$, we will mean only that part of it which corresponds to resistivities of the invaded zone.

Let us take the following frequency and lengths: 10 (KHz); 0.20, 0.25, 0.45, 0.562, 0.70, 0.875, 0.95, 1.188, 1.20, 1.50, 1.45, 1.812, 1.70, 2.125 (m), M=Ml=7. As can be seen, the ratios of the first distance to the second distance (and the third to the fourth, fifth to the sixth etc.) is 0.8. There are seven measurements in all when three coil arrays are used. For a three-coil array two consecutive lengths are taken, and the moments are chosen in such a way as to compensate the direct field. The lengths ratio for the three-coil array is 0.8, the length of the next array is 0.25 m greater (according to the short array). For these values and exemplary models of the formation, the relative error for the forward problem equation (2) does not exceed 0.1% (this error increases with frequency and array length).

Geometric factors of invaded zone and the borehole are linearly dependent on frequency; and when invaded zone parameters are being determined at a given resistivity of the formation, it is enough to take one frequency and (to reduce equivalence) many lengths. It is known that when the inverse problem is being solved for representation eqn. (2) (or for (2)), if equal relative measurement errors $\epsilon$ and equal solution errors $\delta$ are allowed) the relative solution error is defined by this inequality:

$$\delta = \frac{\|\vec{p}_\Delta\|}{\|\vec{p}\|} \leq \text{cond}\hat{G} \frac{\|\vec{F}_\Delta\|}{\|\vec{F}\|} = \text{cond}\hat{G} \cdot \varepsilon \quad (5)$$

Condition cond $\hat{G}$ is defined as following:

$$\text{cond}\hat{G} = \sqrt{\frac{\lambda_{max}}{\lambda_{min}}},$$

where $\lambda_{max}=\lambda_N$ and $\lambda_{min}$ are the maximal and the minimal (non-zero) eigenvalues of the information matrix $\hat{A}=\hat{G}^T\hat{G}$; $\|\vec{p}_\Delta\|$, $\|\vec{F}_\Delta\|$ are absolute errors. Experience shows that for satisfactory inversion it is necessary for the matrix $\hat{G}$ to contain a complete rank ($\lambda_{min}=\lambda_1$) and cond $\hat{G} \leq 1/\epsilon$.

Figure 11:
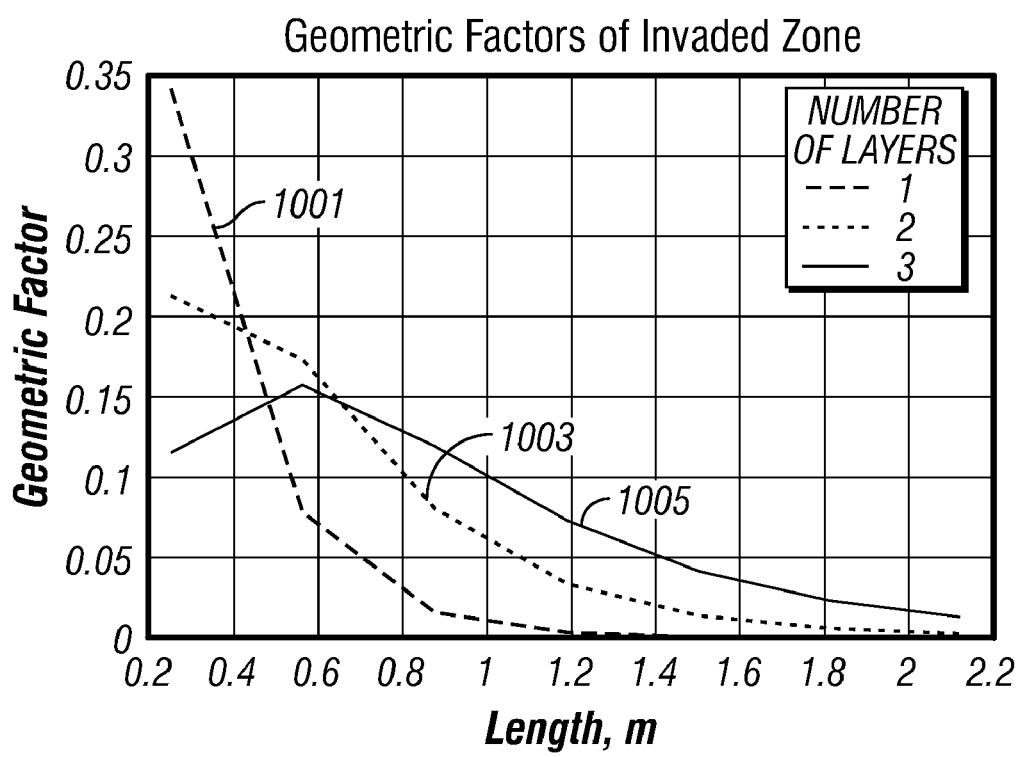
FIG. 11 shows an example of geometric factors for three layers in the invaded zone.

In a general case the number of measurements may be reduced, the major reduction criterion being the decrease of the value of cond $\hat{G}$ due to removing linearly dependent matrix $\hat{G}$ rows. By means of this reduction it is possible to greatly improve the estimated error eqn. (5). Another way of improving the ones, that is, of decreasing cond $\hat{G}$, is to choose adequate normalization, which is achieved by multiplying the matrix of the forward problem by the appropriate diagonal matrix from the left. Results of constructing the matrix $\hat{G}$ have shown that for subdivision of the invaded zone into layers of equal thickness we obtain the following: cond $\hat{G}=1525$ for five layers, cond $\hat{G}=117$ for four layers, cond $\hat{G}=14.5$ for three layers. Thus, for a 1% measurement error, invaded zone may be subdivided into no more than three subzones, and the quality of the obtained solution will depend on the model. For a model in which $r_1=0.1$ m, $r_2=0.266$ m, $r_3=0.433$ m, $r_4=0.6$ m; $\vec{\sigma}_0=(1,\ldots 1)$, the layers are shown, for example, in FIGS. 4A, 4B, 5A, 5B, 6A and 6B. Geometric factors for the three uniform layers inside invaded zone are shown in FIG. 11 as 1001, 1003 and 1005.

Figure 12:
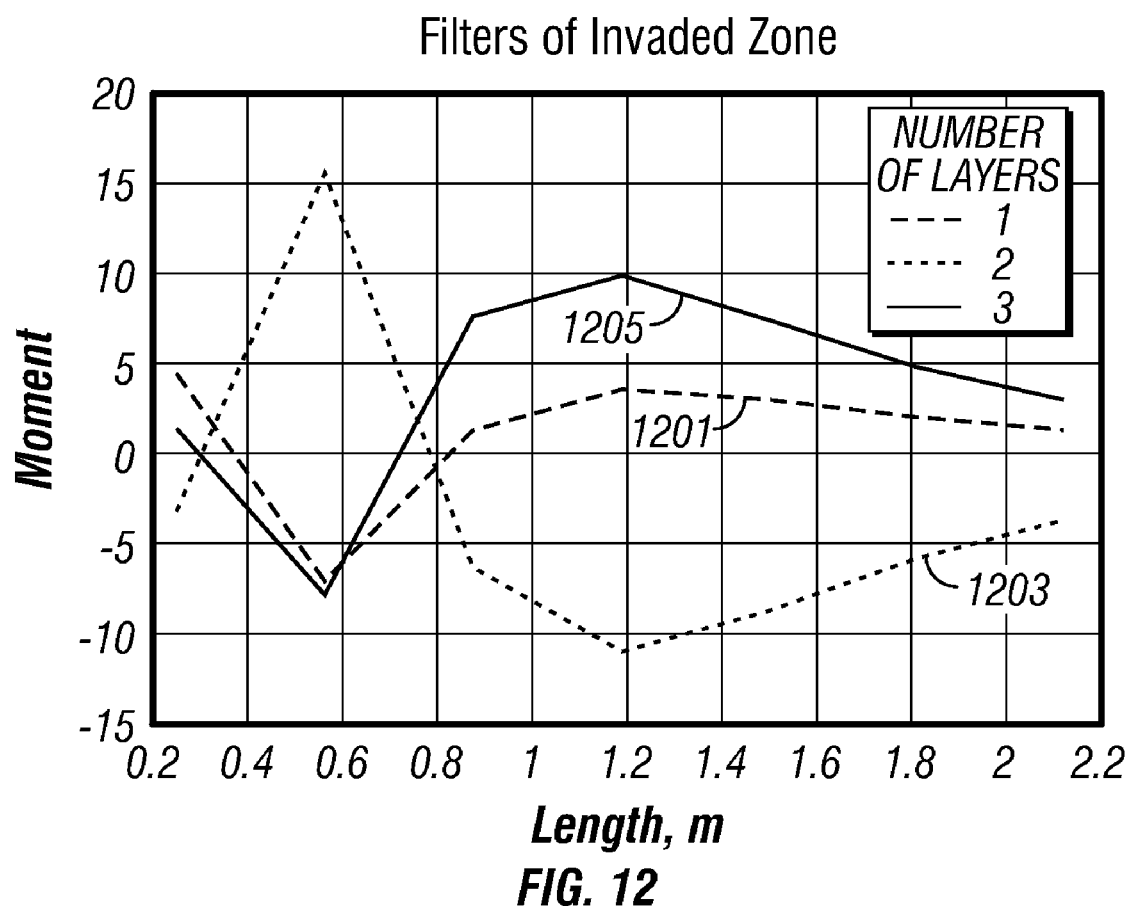
FIG. 12 shows filters for signal transformation, when the signal is sensitive to only one of the three layers in turn.

It should be noted that the borehole's geometric factor is close to zero (less than 0.04), while the formation's geometric factor ranges from 0.3 to 1, therefore we need to know an accurate value of the formation's conductivity, while the value of the borehole conductivity may be approximate. Filters for signal transformation, when the signal is sensitive to each of the three layers in turn are shown in FIG. 12 by 1201, 1203, 1205.

Filters may be calculated from this formula:

$$\vec{c}_k = \sum_{i=1}^{N_2} \frac{v_{ki}}{\sqrt{\lambda_i}} \vec{u}_i$$

where $v_{ki}$ is k-component of the eigenvector of the matrix $\hat{A}=\hat{G}^T\hat{G}$, corresponding to the eigenvalue $\lambda_i$; $\vec{u}_i$ is the eigenvector of the matrix $\hat{A}_T=\hat{G}\hat{G}^T$, corresponding to the same eigenvalue, $N_2=N-2$.

When the conductivities of the borehole and the formation are known ($R_0$ and $R_t$) the forward problem of eqn. (2) may be written out like this:

$$\vec{F}_N - \vec{F}_{N0} \approx \hat{G}\vec{p} \quad (2b)$$

where $\vec{F}_{N0} = \vec{F}_N(\sigma_1, 0, \ldots, 0) + \vec{F}_N(0, \ldots 0, \sigma_N)$, $$p_i = \frac{\sigma_i}{\sigma_{0i}}, \quad i=2, N-1.$$

Let $\vec{c}_k$ be a filter constructed for defining the k-th layer of invaded zone. Then $$\vec{c}_k^T (\vec{F}_N - \vec{F}_{N0}) \approx \frac{\sigma_{k+1}}{\sigma_{0k+1}}.$$

Substituting synthetic data $\vec{F}^E$ for $\vec{F}$, we obtain the value of $\sigma_{k+1}$. For eqn. (2b) the estimated solution error can be presented as follows:

$$\delta \leq \text{cond}\hat{G} \cdot \frac{\|\vec{F}_{N\Delta}\|}{\|\vec{F}_N - \vec{F}_{N0}\|} = \quad (5a)$$

$$\text{cond}\hat{G} \cdot \varepsilon \cdot \frac{\|\vec{F}_N\|}{\|\vec{F}_N - \vec{F}_{N0}\|} \leq \text{cond}\hat{G} \cdot \varepsilon \cdot \frac{1}{1 - \|\vec{F}_{N0}\|/\|\vec{F}_N\|}$$

That is, the normalized signal decrease also influences the error of the solution.

Synthetic data $\vec{F}^E$ can be modeled based on the true model, and a random error added (less than or equal to 1% at each measurement). The pattern of error distribution is unknown. To estimate the quality of the solution we will use mean square deviation of model data from synthetic data (in %)

$$\Delta = \sqrt{\frac{1}{M}\left(\frac{F_j^E - F_j}{F_j^E}\right)^2} \cdot 100\%$$

and the mean difference of filtered values $$\Delta_k = \frac{\vec{c}_k^T \vec{F}_N^E - \vec{c}_k^T \vec{F}_N}{\vec{c}_k^T \vec{F}_N^E} \cdot 100\%,$$

$$F_{Nj}^E = \frac{F_j^E(\vec{\sigma})}{F_j(\vec{\sigma}_0)}.$$

The matrix of the system does not depend on medium conductivities so the inverse problem solved by filters is equivalent to solving a set of equations by SVD method. One might draw certain conclusions here. It appears impossible to evaluate high values of resistivities due to their small contribution into the signal. However, this result is helpful, being an initial model for further detailed interpretation, e.g. using filters built for higher frequencies and depending on the model itself.

An important feature of the inversion method discussed here is instantaneous computing of conductivities based on given values of $\vec{c}_k$. The values of $\vec{c}_k^T \vec{F}_{N0}$ can be computed by means of linear interpolation across a certain grid $\{\sigma_1, \sigma_N\}$. The quality of inversion depends on the value of δ in the estimation given by eqn. (5a). Thus, when δ gets too high (over 100%), one could try reducing the dimension of the set or adding new measurements to reduce equivalence. Generally equivalence is defined by the inequality $\|d\vec{F}\| \leq \epsilon$, where $$dF_j = \frac{\tilde{F}_j - F_j}{F_j};$$

$F_j$ – data, corresponding to inverted model, $\tilde{F}_j$–data, corresponding to equivalent model. An important advantage of the solution obtained is that now one can easily compute the integral conductivity of invaded zone.

We next discuss solving inverse problem with $\hat{G}$ being a Jacobian. Eqn. (1) may be rewritten as follows:

$$\vec{F} \approx \vec{F}_0 + \hat{G}\vec{p} \tag{1a}$$

Elements of the matrix $\hat{G}$ are derivatives of the signal with respect to the logarithm of conductivity computed for the initial model with the conductivities $\vec{\sigma}_0$:

$$G_{ji} = -\frac{\partial F_j}{\partial \sigma_{i+1}}(\vec{\sigma}_0) \cdot \sigma_{0i+1} = \frac{\partial F_j}{\partial \rho_{i+1}}(\vec{\rho}_0) \cdot \rho_{0i+1}, \tag{6}$$

$$p_i = \frac{\rho_{i+1} - \rho_{0i+1}}{\rho_{0i+1}}$$

The arrays lengths are the same as for geometric factors. Frequencies are limited from above by 10 MHz (this is an attempt to avoid the permittivity effect and hardware complications related to constructing coils at very high frequencies).

Let us try to find out how many subzones could be identified within the invaded zone in this case, and evaluate the quality of the solution.

For the eqn. (1) in light of eqn. (6), the solution error can be defined as follows:

$$\|\vec{\delta}\| \leq \frac{\varepsilon}{\sqrt{\lambda_1}} \|\vec{F}_0\|$$

or, if the solution contains identical relative errors, $$\delta \leq \frac{\varepsilon}{\sqrt{\lambda_1 N}} \|\vec{F}_0\|. \tag{7}$$

The value of cond $\hat{G}$ shows how admissible domains of changing the generalized parameters differ. Because at high frequencies signals go through zero, derivatives of the logarithm of the signal are not used. To improve the estimation (7) and to reduce the value of cond $\hat{G}$, normalization to the norm of the corresponding row of the matrix $\hat{G}$ may be useful:

$$\vec{F}_N - \vec{F}_{N0} \approx \hat{G}_N \vec{p},$$

$$F_{Nj} = \frac{F_j(\vec{\sigma})}{g_j},$$

$$g_j = \sqrt{\sum_{i=1}^{N_2} G_{ji}^2},$$

$$G_{Nji} = \frac{G_{ji}}{g_j}.$$

From now on, we will drop the subscript N for $\hat{G}_N$:

$$\vec{F}_N - \vec{F}_{N0} \approx \hat{G}\vec{p} \tag{1-b}$$

To estimate the error for identical relative errors, the following formula is used:

$$\delta \leq \frac{\varepsilon}{\sqrt{\lambda_1 N}} \|\vec{F}_{N0}\| \tag{7-a}$$

Computations for different models have shown that, in this system of measurement, only high frequencies (over 1 MHz) are important. Optimization criteria were the minimal values of cond $\hat{G}$ and δ from eqn. (7a). According to these criteria for different model types the following system of frequencies and lengths was chosen: 2128.1, 3275.3, 4307.8, 5237.0, 6073.3, 6826.0, 7503.4, 8113.0, 8661.7, 9155.6, 9600.0, 10000.0 (KHz); 0.20, 0.25, 0.45, 0.562, 0.70, 0.875, 0.95, 1.188, 1.20, 1.50, 1.45, 1.812, 1.70, 2.125 (m), for a total of M=84 measurements.

It should be noted that this choice of lengths and frequencies is not the best for all models. It appears reasonable to have a finer grid (system of measurement) for both lengths and frequencies, so that for each model type the optimal values could be chosen. In Table A-1 values of cond $\hat{G}$ and δ for the exemplary models are given. The invaded zone is subdivided into three or four equal subzones. The solution of eqn. (7a) is not as critical as the solution of eqn. (5a) for the exact problem because the forward problem is not linear, and inversion is an iterative process. Whether or not it is possible to identify three or four layers could be determined, for some model classes, only after inversion tests.

TABLE A-1

| $\rho_1$, | Three layers | | Four layers | |
| --- | --- | --- | --- | --- |
| Ohm · m | cond $\hat{G}$ | $\Delta$ | cond $\hat{G}$ | $\delta$ |
| 0.1 | 6.9 | 17 | 52 | 115 |
| 2.0 | 10 | 26 | 75 | 162 |
| 1000.0 | 26 | 72 | 52 | 231 |

In the case when initial approximation for invaded zone's conductivity is not available or is given with a large error, the error of the linear representation of forward problem of eqn. (1b) is also large. For this reason, an iterative process is used for inversion. First of all the sequence of determining parameters is fixed. For example first determining parameter—those which corresponds to maximal diagonal element of matrix $\hat{A}$, last determining parameter corresponds to minimal diagonal element of $\hat{A}$. To evaluate each parameter, a filter $\vec{c}_k$ is created, and the value $\Delta_k$ is minimized on the interval of valid values of the parameter. The conductivities $\vec{\sigma}_0$ are formed each time as prior values, already known at every previous step of minimization. When the determination of all unknown parameters of the model is complete, there is possible to repeat all the previous steps (to perform the second iteration), based on the model obtained after the first iteration. The second iteration could be necessary when initial approximation is too far from the true value and the $\Delta \leq \|\delta \vec{F}^E\| \cdot 100\%$ has not been achieved yet. When minimization on the admissible interval is performed, several minimums are possible. In this case, the minimum with the smallest $\Delta$ is chosen. In the case when $\Delta$ is small enough, a reverse of $\hat{G}$ by means of SVD could be performed, the criterion for success may be the $\Delta$ decrease. The condition for ending the inversion process is stabilization of the solution over the subsequent iterations.

The results of inversion by geometric factors can be greatly improved at the frequencies up to 10 MHz. In some cases it is possible to distinguish 4 subzones. At the same time initial guess may provide only two subzones. It may occur when formation is much more conductive relatively invaded zone. Then special formulae are applied to construct missing initial resistivities. Formulae are based on the principle of saving integral conductivity of invaded zone. First case is when from two initial resistivities we obtain three ones. Let $\rho_{01}, \rho_{02}$ be two initial resistivities, $\rho_1, \rho_2, \rho_3$ be three initial resistivities we want to obtain. Then $\rho_1 = \rho_{01}$, $$\rho_3 = \rho_{02},$$

$$\rho_2 = \frac{2}{\frac{1}{\rho_{01}} + \frac{1}{\rho_{02}}}$$

Let $\rho_{01}, \rho_{02}$ be two initial resistivities, $\rho_1, \rho_2, \rho_3, \rho_4$ be four initial resistivities we want to obtain. Then $$\rho_1 = \rho_{01},$$

$$\rho_4 = \rho_{02},$$

$$\rho_2 = \rho_3 = \frac{2}{\frac{1}{\rho_{01}} + \frac{1}{\rho_{02}}}$$

Let $\rho_{01}, \rho_{02}, \rho_{03}$ be three initial resistivities, $\rho_1, \rho_2, \rho_3, \rho_4$ be four initial resistivities we want to obtain. Then $$\rho_1 = \rho_{01},$$

$$\rho_4 = \rho_{03},$$

$$\rho_2 = \frac{3}{\frac{1}{\rho_{01}} + \frac{2}{\rho_{02}}},$$

$$\rho_3 = \frac{3}{\frac{1}{\rho_{03}} + \frac{2}{\rho_{02}}}$$

Computations of different models have shown that, in order to identify five subzones within invaded zone, one needs frequencies of up to 150 MHz. The optimization criteria for the system of observation were the minimal values of cond $\hat{G}$ and $\delta$ from eqn. (A-7a), just as before. The following system of frequencies and lengths was chosen: 20988.4, 50790.7, 74632.6, 93706.1, 108964.8, 121171.9, 130937.5, 138750.0, 145000.0, 150000.0 (KHz); 0.2, 0.25, 0.4, 0.494, 0.6, 0.732, 0.8, 0.964, 1.0, 1.19, 1.2, 1.41, 1.4, 1.624, 1.6, 1.832 (m), M=80.

The measured signal is the phase difference in the three-coil array. Due to the impossibility of considering the permittivity effect at this stage of research, a presupposition has been made that permittivity $\epsilon$ does not have any significant impact on the resolution, and it has been assumed that $\epsilon=0$.

An example of inverting for five subzones is shown in FIG. 10. For the initial approximation based on a two-layer model of invaded zone the following formulae have been used.

$$\rho_1 = \rho_{01},$$

$$\rho_5 = \rho_{02},$$

$$\rho_3 = \frac{2}{\frac{1}{\rho_{01}} + \frac{1}{\rho_{02}}},$$

$$\rho_2 = \frac{3}{\frac{1}{\rho_3} + \frac{2}{\rho_{01}}},$$

$$\rho_4 = \frac{3}{\frac{1}{\rho_3} + \frac{2}{\rho_{02}}}$$

For initial approximation based on a three-layer model of invaded zone the formulae were:

$$\rho_1 = \rho_{01},$$

$$\rho_3 = \rho_{02},$$

$$\rho_5 = \rho_{03},$$

-continued $$\rho_2 = \frac{3}{\frac{1}{\rho_{02}} + \frac{2}{\rho_{01}}},$$

$$\rho_4 = \frac{3}{\frac{1}{\rho_{02}} + \frac{2}{\rho_{03}}}$$

For some models and frequencies, the phase difference as function of the length jumps through zero. Such jump functions can cause serious difficulties in inversion, and for this reason the measurement corresponding to a negative phase difference was deleted from the system of measurement.

It is necessary to point out the following. A non-conductive borehole has practically no impact on the signal, thus we do not need to know its resistivity precisely. For instance, one can assume it is 900 Ω-m instead of 1000 Ω-m. If the resistivity of the formation is known with a significant error, e.g. 10%, this parameter may be included into the set (A-1) and corrected in the same way as the resistivities of invaded zone. It might be that, to determine six parameters, the system of observation will have to be modified.

When the resistivities of the formation and of the conductive borehole are known with poor precision, these parameters could be included into the set (A-1). Then $\delta$ would almost double, and cond $\hat{G}$ would double or even triple. At the same time, the real area of equivalence would increase greatly, and, to reduce it, the system of measurement will have to be modified. Without this modification, the chosen system of measurement would enable us to determine only six parameters with reasonable reliability. Therefore, preliminary inversion should give a good evaluation of either the borehole resistivity or the resistivity of the formation.

Once the formation resistivity has been determined, values of the determined resistivity may be displayed as a log and/or stored on a suitable medium. Those versed in the art would recognize that knowledge of formation resistivity is of great utility in the evaluation and development of hydrocarbon reservoirs. Specifically, accurate resistivity measurements may be used to interpret petrophysical quantities such as water saturation and sand content. Further applications include geologic correlation, determination of hydrocarbon/water contact, invasion profile definition, fracture identification and estimation of moveable hydrocarbons. Thus, with the knowledge of resistivity, decisions can be made about additional evaluation wells to be drilled and location and number of development wells. Time-lapse measurements of resistivity may be used to estimate formation permeability.

Implicit in the acquisition and processing the data is the use of a processor. The term processor is intended to include such devices as a field processing gate array (FPGA). The processor may carry out instructions stored on a computer-readable medium such as a read-only memory (ROM), a programmable read-only memory (PROM), an electrically programmable read-only memory (EPROM), an electrically alterable read-only memory (EAROM), an electrically erasable and programmable read-only memory (EEPROM), a flash memory, an optical disk, a hard drive, an iPod®, and/or a non-volatile read-write memory (NOVRAM).

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of evaluating invasion of a borehole fluid into an earth formation, the method comprising:
   (a) conveying into a borehole in the earth formation a resistivity measuring instrument having at least one transmitter and a plurality of pairs of receivers spaced apart from the at least one transmitter;
   (b) activating the at least one transmitter at at least one frequency and inducing signals in the plurality of pairs of receivers, the induced signals indicative of the resistivity of at least three subzones inside an invaded zone; and
   (c) filtering the induced signals from the plurality of pairs of receivers and providing an estimate of a resistivity of the at least three subzones.

2. The method of claim 1 further comprising recording the estimate of the resistivity on a suitable medium.

3. The method of claim 1 further comprising using one of each of the pairs of receivers as a main coil and the other of each of the pairs of receives as a bucking coil.

4. The method of claim 1 wherein the at least one frequency is less than 25 kHz.

5. The method of claim 1 wherein a distance from the transmitter to at least one of the pairs of receivers is greater than 1 m.

6. The method of claim 1 wherein a distance from the transmitter to at least one of the pairs of receivers is less than 0.3 m.

7. The method of claim 1 further comprising repeating steps (a)-(b) after an elapsed time interval, and using the estimated resistivity of the at least three subzones inside invaded zone before and after the and elapsed time interval for estimating a permeability of the earth formation.

8. The method of claim 1 further comprising:
   (i) activating the at least one transmitter at a plurality of frequencies greater than about 0.5 MHz and inducing additional signals in the plurality of pairs of receivers,
   (ii) using the estimate of the resistivity and the additional signals for providing an updated estimate of the resistivity of the at least three zones.

9. The method of claim 8 wherein the borehole contains a fluid having a resistivity greater than about 0.1 Ω-m.

10. The method of claim 8 wherein the at least three zones further comprises at least five zones.

11. The method of claim 8 wherein providing the updated estimate of the resistivity further comprises using an iterative gradient method.

12. An apparatus for evaluating invasion of a borehole fluid into an earth formation, the apparatus comprising:
   (a) a resistivity measuring instrument configured to be conveyed into the borehole, the instrument having:
      (A) at least one transmitter configured to be activated at least one frequency, and
      (B) a plurality of pairs of receivers spaced apart from the at least one transmitter configured to receive signals resulting from the activation of the at least one transmitter, the signals indicative of a resistivity of at least three subzones inside an invaded zone; and
   (b) a processor configured to filter the signals from the plurality of pairs of receivers and provide an estimate of the resistivity of the at least three subzones.

13. The apparatus of claim 12 wherein the processor is further configured to record the estimate of the resistivity on a suitable medium.

14. The apparatus of claim 12 wherein one of each of the pairs of receivers further comprises a main receiver and a bucking receiver.

15. The apparatus of claim 12 wherein the at least one frequency is less than 25 kHz.

16. The apparatus of claim 12 wherein a distance from the transmitter to at least one of the pairs of receivers is greater than 1 m.

17. The apparatus of claim 12 wherein a distance from the transmitter to at least one of the pairs of receivers is less than 0.3 m.

18. The apparatus of claim 12 further comprising a conveyance device configured to convey the resistivity measuring instrument into the borehole, the conveyance device selected from the group consisting of: (i) a wireline, and (ii) a drilling tubular.

19. The apparatus of claim 12 wherein the at least one transmitter is further configured to be activated at a plurality of frequencies greater than about 0.5 MHz and wherein the processor is further configured to use the estimate of the resistivity and additional signals from the plurality of receivers resulting from the further activation of the at least one transmitter to provide an updated estimate of the resistivity of the at least three zones.

20. The apparatus of claim 19 wherein the borehole contains a fluid having a resistivity greater than about 0.1 Ω-m.

21. The apparatus of claim 19 wherein the at least three zones further comprises at least five zones.

22. The apparatus of claim 19 wherein the processor is configured to provide the updated estimate of the resistivity using an iterative gradient method.

23. A computer-readable medium for use with an apparatus for evaluating invasion of a borehole fluid into an earth formation, the apparatus comprising:
(a) a resistivity measuring instrument configured to be conveyed into the borehole, the instrument having:
 (A) at least one transmitter configured to be activated at least one frequency, and
 (B) a plurality of receivers spaced apart from the at least one transmitter configured to receive signals resulting from the activation of the at least one transmitter, the signals indicative of a resistivity of at least three subzones inside an invaded zone;
the medium comprising instructions which enable a processor to:
(b) filter the signals from the plurality of pairs of receivers and provide an estimate of the resistivity of the at least three subzones.

24. The apparatus of claim 23 further comprising at least one off: (i) a read-only memory, (ii) a programmable read-only memory, (iii) an electrically programmable read-only memory, (iv) an electrically alterable read-only memory, (v) an electrically erasable and programmable read-only memory, (vi) a flash memory, (vii) an optical disk, (viii) a hard drive, (ix) an iPod®, and (x) a non-volatile read-write memory.

* * * * *

UNITED STATES PATENT AND TRADEMARK OFFICE
CERTIFICATE OF CORRECTION

PATENT NO.         : 7,567,869 B2                                        Page 1 of 1
APPLICATION NO.    : 11/741575
DATED              : July 28, 2009
INVENTOR(S)        : Marina N. Nikitenko, Leonty A. Tabarovsky and Mikhail I. Epov It is certified that error appears in the above-identified patent and that said Letters Patent is hereby corrected as shown below:

Column 16, claim 1, line 10, delete "indicative of the", insert --indicative of a--;

Column 16, claim 1, line 14, delete "a resistivity", insert --the resistivity--;

Column 16, claim 3, line 20, delete "receives", insert --receivers--;

Column 16, claim 7, line 31, delete "subzones inside", insert --subzones inside the--;

Column 16, claim 7, line 32, delete "the and elapsed", insert --the elapsed--;

Column 16, claim 10, line 44, delete "comprises", insert --comprise--;

Column 18, claim 24, line 19, delete "one off" and insert --one of--.

Signed and Sealed this

Twenty-fifth Day of August, 2009

David J. Kappos
*Director of the United States Patent and Trademark Office*